(12) United States Patent
Gaikwad

(10) Patent No.: US 10,146,615 B2
(45) Date of Patent: Dec. 4, 2018

(54) RECOVERY OF A SYSTEM DIRECTORY AFTER DETECTION OF UNCORRECTABLE ERROR

(71) Applicant: Arteris, Inc., Campbell, CA (US)

(72) Inventor: Parimal Gaikwad, San Jose, CA (US)

(73) Assignee: ARTERIS, Inc., Campbell, CA (US)

( * ) Notice: Subject to any disclaimer, the term of this patent is extended or adjusted under 35 U.S.C. 154(b) by 0 days.

(21) Appl. No.: 15/494,544

(22) Filed: Apr. 24, 2017

(65) Prior Publication Data

US 2018/0307557 A1 Oct. 25, 2018

(51) Int. Cl.
*G06F 11/00* (2006.01)
*G06F 11/10* (2006.01)
*G06F 12/1009* (2016.01)
*G06F 12/0891* (2016.01)

(52) U.S. Cl.
CPC ...... *G06F 11/1016* (2013.01); *G06F 12/0891* (2013.01); *G06F 12/1009* (2013.01); *G06F 2212/65* (2013.01); *G06F 2212/683* (2013.01)

(58) Field of Classification Search
CPC ............. G06F 11/1016; G06F 12/0891; G06F 12/1009; G06F 2212/65; G06F 2212/683
See application file for complete search history.

(56) References Cited

U.S. PATENT DOCUMENTS

| | | | | |
|---|---|---|---|---|
| 5,751,773 A * | 5/1998 | Campana, Jr. | ............ | H04B 7/10 370/503 |
| 6,405,322 B1 * | 6/2002 | Gaither | ................. | G06F 11/004 711/144 |
| 6,457,154 B1 * | 9/2002 | Chen | .................... | G06F 11/1016 714/768 |
| 7,171,591 B2 * | 1/2007 | Chen | ...................... | G11C 29/42 714/52 |
| 7,243,293 B2 * | 7/2007 | Chen | .................... | H03M 13/05 714/781 |
| 7,539,919 B2 * | 5/2009 | Hwang | ............ | G11B 20/00086 360/60 |
| 7,823,042 B2 * | 10/2010 | Hwang | ............ | G11B 20/00086 360/60 |
| 8,181,063 B2 * | 5/2012 | Nakajima | ............ | G06F 11/2038 714/11 |
| 8,683,290 B2 * | 3/2014 | Koshiyama | ......... | G06F 11/1048 714/758 |
| 9,354,967 B1 * | 5/2016 | Craddock | ........... | G06F 11/0745 |
| 9,384,086 B1 * | 7/2016 | Craddock | ............... | G06F 13/00 |

* cited by examiner

*Primary Examiner* — Esaw T Abraham

(57) ABSTRACT

A system and method are disclosed that include recovery of the system directory when an uncorrectable error is detected. According to the various aspects and embodiments of the invention, the system and method disclosed can manage single bit error detection and two-bit error detection.

4 Claims, 2 Drawing Sheets

RECOVERY OF A SYSTEM DIRECTORY AFTER DETECTION OF UNCORRECTABLE ERROR

FIELD OF THE INVENTION

The present invention is in the field of computer systems and, more specifically, to systems-on-chip with coherent memory that communicated with initiators and targets that transmit, store, and operate on memory addresses.

BACKGROUND

Modern computer systems are designed with heterogeneous processing units that perform data processing operations on data values stored in memory. One example of such a system includes addressable memory region of DRAM; and one or more small addressable memory regions. To access a particular data value, a processing unit implements a request address bus that designates the memory location to be accessed.

Processing units may communicate with other processing units and memory through a transport mechanism. In such a system, addresses may be transmitted between units via buses in the transport mechanism and may be stored in transaction tables. If the system contains cache coherent processing units, addresses may also be stored in cache tags. Many processing units and other interconnect agents implement directories. A directory is used to track which agents or processors in the system share data. For every agent that is tracked, there is a tracking bit needed in the tag line of the directory. Thus, as the number of agents grows, the directory size for tracking the information grows exponentially.

Storing full addresses, especially in structures such as cache tags, uses a significant amount of silicon area, which drives manufacturing cost, and transmitting full addresses requires additional wires that further increases silicon area. In addition, operating on full addresses requires significant logic gate delay that limits clock speed and system performance.

Occasionally errors occur in the address information for a system directory. For example, a directory entry may have an error, which may be an uncorrectable error. Whenever an uncorrectable error is detected at a directory entry, while there is a directory lookup, typical implementations disable directory accesses to preserve system coherency. After this point, all accesses to the system directory or directory segment behave as null directory. This causes the system to send snoops to all agents associated with the system directory. This results in an overall degradation of system performance.

Therefore, what is needed is a system and method that allows recovery of the system directory in the situation where an uncorrectable error is detected, while avoiding a drop in or degrading the system performance.

SUMMARY OF THE INVENTION

In accordance with various aspects of the invention, a system and method are provided that include recovery of the system directory when an uncorrectable error is detected. The various aspects and embodiments of the invention result in enhanced system performance and improved reliability of the system as well as greater resilience of the overall coherent system.

Furthermore, according to the various aspects and embodiment of the invention, the ECC overhead is reduced and, hence, reducing system directory size and area. Thus, the system uses less silicon area, less power, operates at a higher clock speed at a lower cost.

DETAILED DESCRIPTION

Figure 1:
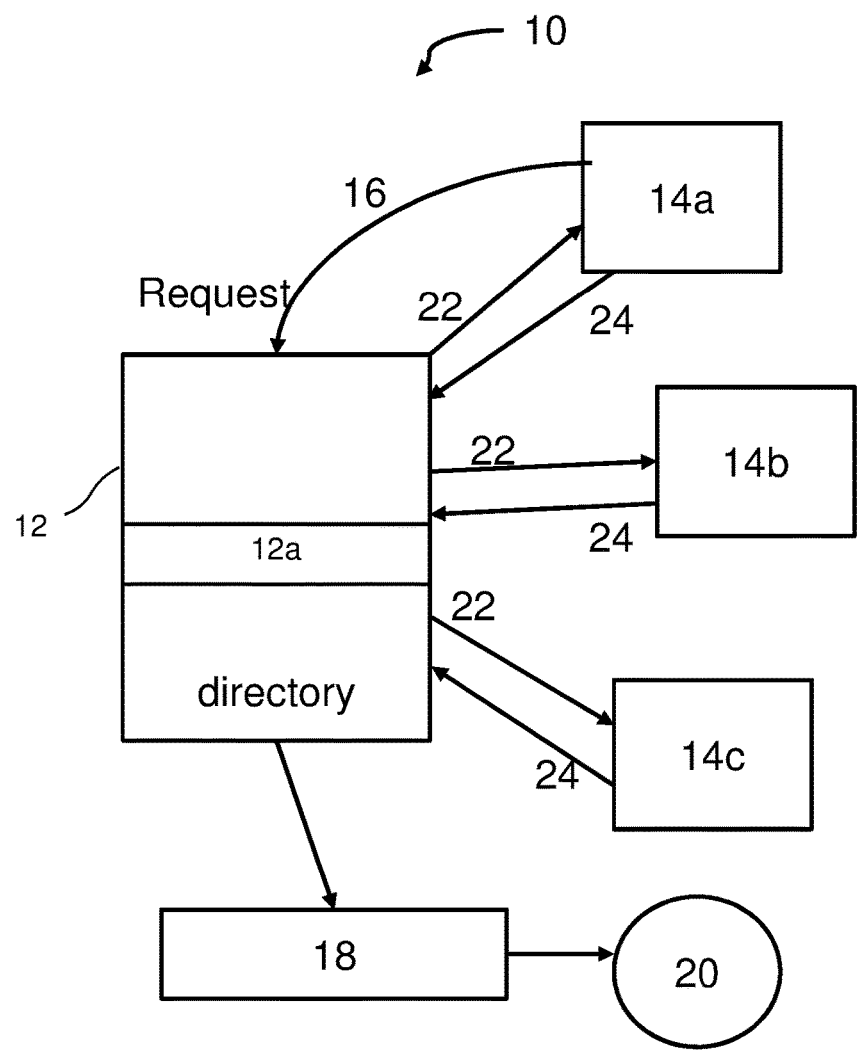
FIG. 1 shows a system with a directory in accordance with the invention.

To the extent that the terms "including", "includes", "having", "has", "with", or variants thereof are used in either the detailed description and the claims, such terms are intended to be inclusive in a similar manner to the term "comprising". The invention is described in accordance with the aspects and embodiments in the following description with reference to the figures, in which like numbers represent the same or similar elements. Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates, which may need to be independently confirmed.

The invention can be embodied in, though not exclusively, a system-on-chip (SoC) that instantiates a cache coherent subsystem. The coherent subsystem has structures for one or more of storing addresses in transaction tables, storing information in FIFOs, storing cache tags, transporting addresses to or from interfaces, and operating on addresses. Some examples of operations are comparing, decoding, and adding.

A cache coherence system performs at least three essential functions:

1. Interfacing to coherent agents—This function includes accepting transaction requests on behalf of a coherent agent and presenting zero, one, or more transaction responses to the coherent agent, as required. In addition, this function presents snoop requests, which operate on the coherent agent's caches to enforce coherence, and accepts snoop responses, which signal the result of the snoop requests.
2. Enforcing coherence—This function includes serializing transaction requests from coherent agents and sending snoop requests to a set of agents to perform coherence operations on copies of data in the agent caches. The set of agents may include any or all coherent agents and may be determined by a directory or snoop filter (or some other filtering function) to minimize the system bandwidth required to perform the coherence operations. This function also includes receiving snoop responses from coherent agents and providing the individual snoop responses or a summary of the snoop responses to a coherent agent as part of a transaction response.
3. Interfacing to the next level of the memory hierarchy—This function includes issuing read and write requests to a memory, such as a DRAM controller or a next-level cache, among other activities.

Performing these functions in a single unit has the benefit of keeping the logic for these related functions close together, but has several major drawbacks. The single unit will be large, and therefore will use a significant amount of silicon area. That will cause congestion in routing of wires around the unit. A single unit will also tend to favor having a single memory or, if multiple memories are used, having them close together to avoid having excessively long wires between the single coherence unit and the memories. Multiple memories, which are typically implemented with interleaved address ranges, are increasingly prevalent.

An aspect of the invention is separation of the functions of a cache coherence system into multiple distinct units, and coupling of them with a transport network. The units communicate by sending and receiving information to each other through the transport network. The units are, fundamentally:

1. Agent Interface Unit (AIU)—This unit performs the function of interfacing to one or more agents. Agents may be fully coherent, IO-coherent, or non-coherent. The interface between an agent interface unit and its associated agent uses a protocol. The Advanced Microcontroller Bus Architecture (AMBA) Advanced eXtensible Interface (AXI) Coherency Extensions (ACE) is one such protocol. In some cases, an agent may interface to more than one agent interface unit. In some such cases, each agent interface unit supports an interleaved or hashed subset of the address space for the agent.
2. Coherence Controller Unit—This unit performs the function of enforcing coherence among the coherent agents for a set of addresses.
3. Memory Interface Unit—This unit performs the function of interfacing to all or a portion of the next level of the memory hierarchy.
4. Local memory—The memory, for example SRAM, might be used by a unit to store information locally. For instance, a snoop filter will rely on storage by the Coherence Controller Unit of information regarding location and sharing status of cache lines. This information might be stored in a Local memory, which is in communication with a directory.

Referring now to FIG. 1, a system 10 is shown with a directory 12, agents 14a, 14b, 14c, and 14d. Agent 14a sends a request 16. The request 16 is received at the directory 12. The directory 12 accesses a directory entry 12a, which is an entry that is associated with the request 16. The directory 12 sends the directory entry 12a to a fault detection unit 18. Using error detection, such as ECC or SECDED or Parity, the fault detection unit 18 generates an output. The output indicates if an error was detected. If there is no error or if the error can be corrected, then the directory 12 continues operation and sends a response (not shown) to the request 16. If the fault detection unit 18 detects an uncorrectable error, then the fault detection unit stalls traffic to the directory 12 and halts operation of the directory 12. The directory 12 takes the directory entry 12a, which has an uncorrectable error, and determines all possible addresses that might be in error based on the entry 12a with the uncorrectable error.

For example, if the directory entry is 8-bits long and reads as follows:

1-0-0-1-0-0-1-1 then, in accordance with some embodiments of the invention, the system performs single error detection and one bit is in error; it may be any one of the 8-bits. In accordance with the various aspects and embodiments of the invention, the error detection used cannot determine which bit is in error, but knows that one of the bits is in error. Thus, the directory 12 generates an address list of all the other possible addresses, which are associated with the directory entry 12a, such as all of the following address entries set forth in TABLE 1 below:

TABLE 1

| 0-0-0-1-0-0-1-1 |
|---|
| 1-1-0-1-0-0-1-1 |
| 1-0-1-1-0-0-1-1 |
| 1-0-0-0-0-0-1-1 |
| 1-0-0-1-1-0-1-1 |
| 1-0-0-1-0-1-1-1 |
| 1-0-0-1-0-0-0-1 |
| 1-0-0-1-0-0-1-0 |

In accordance with some aspects and embodiments of the invention. if the directory entry is 8-bits long and reads as follows:

1-0-0-1-0-0-1-1 then with Double error detect any 2 of the 8-bits may be in error. In accordance with the various aspects and embodiments of the invention, the error detection used cannot determine which bits are in error, but knows that two of the bits is in error. Thus, the directory 12 generates an address list of the other possible addresses, which are associated with the directory entry 12a, such as all of the following address entries are shown in TABLE 2 below:

TABLE 2

| 1-0-0-1-0-0-0-0 |
|---|
| 1-0-0-1-0-1-1-0 |
| 1-0-0-1-1-0-1-0 |
| 1-0-0-0-0-0-1-0 |
| 1-0-1-1-0-0-1-0 |
| 1-1-0-1-0-0-1-0 |
| 0-0-0-1-0-0-1-0 |
| 1-0-0-1-0-1-0-1 |
| 1-0-0-1-1-0-0-1 |
| 1-0-0-0-0-0-0-1 |
| 1-0-1-1-0-0-0-1 |
| 1-1-0-1-0-0-0-1 |
| 0-0-0-1-0-0-0-1 |
| 1-0-0-1-1-1-1-1 |
| 1-0-0-0-0-1-1-1 |

TABLE 2-continued 1-0-1-1-0-1-1-1
1-1-0-1-0-1-1-1
0-0-0-1-0-1-1-1
1-0-0-0-1-0-1-1
1-0-1-1-1-0-1-1
1-1-0-1-1-0-1-1
0-0-0-1-1-0-1-1
1-0-1-0-0-0-1-1
1-1-0-0-0-0-1-1
0-0-0-0-0-0-1-1
1-1-1-1-0-0-1-1
0-0-1-1-0-0-1-1
0-1-0-1-0-0-1-1

For the list of all possible addresses that would be associated with the directory entry 12a and the addresses that are in error. Thus, the directory 12 can now invalidate all of the addresses list in TABLE 1, which would be associated with the directory entry 12a that includes an uncorrectable error. As such, the directory 12 sends an invalidation command 22 to all addresses determined in TABLE 1, each of which would be an address location associated with an agent, such as agents 14a, 14b and 14c. Once the invalidation commands 22 are send to each of the agents and a response 24 is received that the invalidation has taken place, then the fault detection unit 18 is notified. Then the fault detection unit 18 allows the directory 12 to resume operation.

In this way, when an uncorrectable error is detected, the system does not disable operation of the directory due to the uncorrectable error. Instead, the operation of directory is halted and immediately resumed once the invalidation commands are send and a response is received that the invalidation has taken place. This is especially important for systems with configurable IP, wherein the directory address can be changed and updated regularly.

For systems of configurable IP, a designer specifies addressable memory regions, and whether each is coherent. A software configuration tool then uses the specification to generate a hardware description of structures that implement compression according to the various aspects and embodiments of the invention.

Processing units, and other agents, assert addresses as part of performing memory transactions. Each memory location and its corresponding address represents a certain type of memory. In accordance with the various aspects of the invention, each address is first classified as a non-memory address or as a memory address. Non-memory addresses represent either illegal (reserved) locations or non-memory locations. Memory addresses represent either coherent-capable memory locations, i.e. those that are capable of coherency, or memory locations that are not capable of being coherent due to strict specification or design constraints. All cacheable memory is also coherent-capable memory. Memory locations that are not capable of being coherent are called non-coherent memory locations. Memory locations are grouped into memory regions such that each memory region corresponds to a particular addressable slave.

System-on-chip (SoC) designs can embody cache coherence systems according to the invention. Such SoCs are designed using models written as code in a hardware description language. A cache coherent system and the units that it comprises, according to the invention, can be embodied by a description in hardware description language code stored in a non-transitory computer readable medium. Many SoC designers use software tools to configure the coherence system and its transport network and generate such hardware descriptions. Such software runs on a computer, or more than one computer in communication with each other, such as through the Internet or a private network. Such software is embodied as code that, when executed by one or more computers causes a computer to generate the hardware description in register transfer level (RTL) language code, the code being stored in a non-transitory computer-readable medium. Coherence system configuration software provides the user a way to configure the number of agent interface units, coherence controllers, and memory interface units; as well as features of each of those units. Some embodiments also allow the user to configure the network topology and other aspects of the transport network. Some embodiments use algorithms, such as ones that use graph theory and formal proofs, to generate a topology network.

Figure 2:
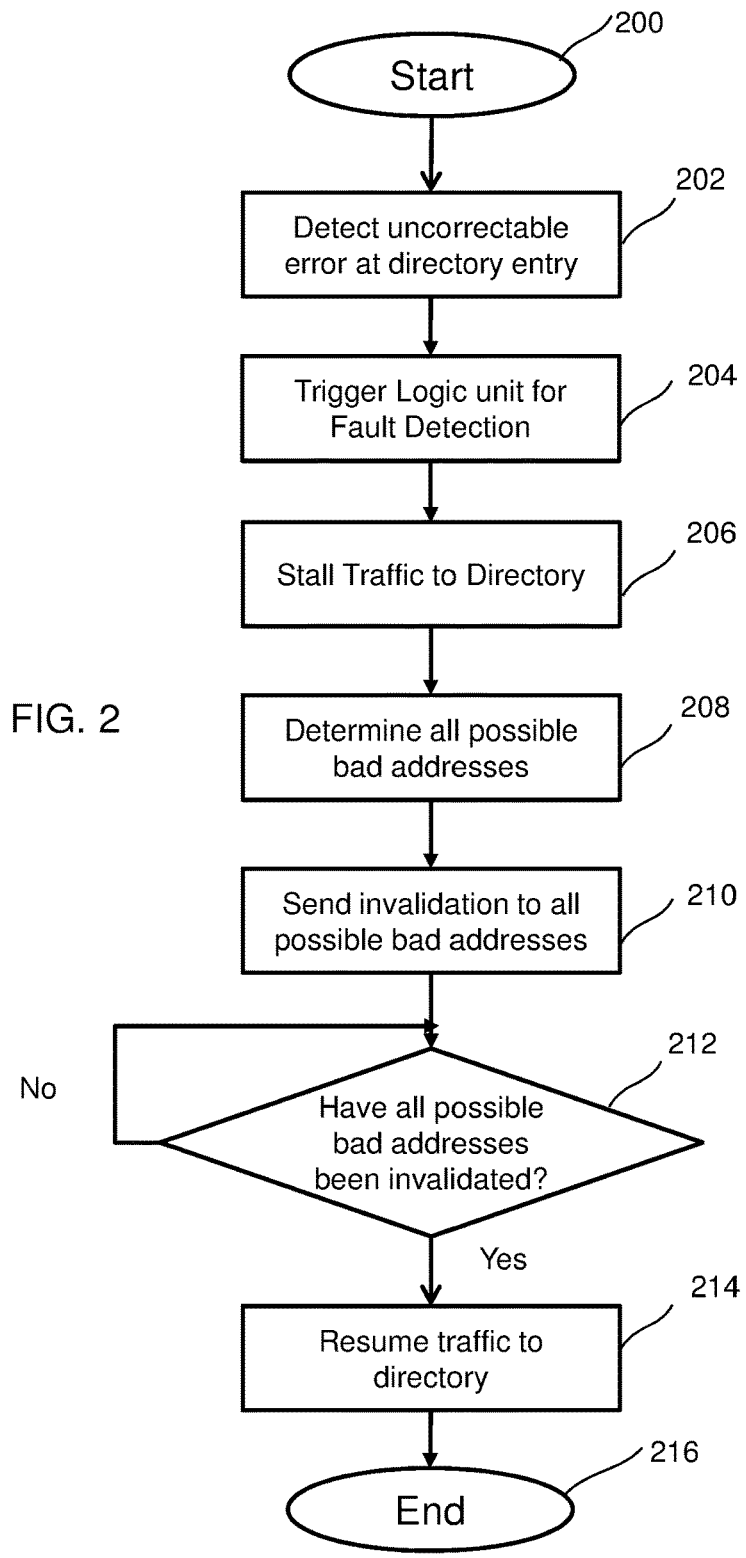
FIG. 2 shows a process when an uncorrectable error is detected in accordance with the present invention.

Referring now to FIG. 2, a process is shown that begins at step 200 in accordance with the aspects of the invention. At step 202 the system detects an uncorrectable error at the directory entry. At step 204, the system triggers the fault detection unit or logic unit. At step 206, the fault detection unit or logic unit sends a signal to the system to halt or stall traffic to the directory. At step 208, the system uses the directory entry with the uncorrectable error to generate or determine the possible addresses that could have been the correct address to create a list of possible bad addresses, such as those in Table 1 or Table 2. The possible bad addresses are based on the detected uncorrectable error. The possible bad addresses are a sub-set of directory address entries in the directory and includes the uncorrectable error at the directory entry. At step 210, the directory sends an invalidation command or signal to all the addresses determined to be the possible bad addresses. As described herein, the possible bad address are a list of address, wherein one of the possible bad addresses represents the correct address that would have been determined by the directory if there was no uncorrectable error detected at the directory entry. The system then invalidates the entry at each of the possible bad address, such as those in Table 1 or Table 2. In response to the invalidation command or signal, the directory received response signal indicating that the address has been invalidated. At step 212, the system determines if all of the possible bad addresses are invalidated. If so, then the system resumes traffic to the directory at step 214. The process concludes at step 216. If not, then the system continues to monitor until all the possible bad addresses have been invalidated.

Some typical steps for manufacturing chips from hardware description language descriptions include verification, synthesis, place & route, tape-out, mask creation, photolithography, wafer production, and packaging. As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

Another benefit of the separation of functional units, according to the invention, is that intermediate units can be used for monitoring and controlling a system. For example, some embodiments of the invention include a probe unit within the transport network between one or more agent interface units and the other units to which it is coupled. Different embodiments of probes perform different functions, such as monitoring bandwidth and counting events. Probes can be placed at any point in the transport network topology.

The invention can be embodied in a physical separation of logic gates into different regions of a chip floorplan. The actual placement of the gates of individual, physically separate units, might be partially mixed, depending on the floorplan layout of the chip, but the invention is embodied in a chip in which a substantial bulk of the gates of each of a plurality of units is noticeably distinct within the chip floorplan.

The invention can be embodied in a logical separation of functionality into units. Units for agent interface units, coherence controller units, and memory interface units may have direct point-to-point interfaces. Units may contain a local memory such as SRAM. Alternatively, communication between units may be performed through a communication hub unit.

The invention, particularly in terms of its aspect of separation of function into units, is embodied in systems with different divisions of functionality. The invention can be embodied in a system where the functionality of one or more of the agent interface units, coherence controller units, and memory interface units are divided into sub-units, e.g. a coherence controller unit may be divided into a request serialization sub-unit and a snoop filter sub-unit. The invention can be embodied in a system where the functionality is combined into fewer types of units, e.g. the functionality from a coherence controller unit can be combined with the functionality of a memory interface unit. The invention can be embodied in a system of arbitrary divisions and combinations of sub-units.

Some embodiments of a cache coherent system according to the invention have certain functionality between an agent and its agent interface unit. The functionality separates coherent and non-coherent transactions. Non-coherent transactions are requested on an interface that is not part of the cache coherent system, and only coherent transactions are passed to the agent interface unit for communication to coherence controller units. In some embodiments, the function of separating coherent and non-coherent transactions is present within the agent interface unit.

In accordance with some aspects and some embodiments of the invention, one or more agent interface units communicate with IO-coherent agents, which themselves have no coherent caches, but require the ability to read and update memory in a manner that is coherent with respect to other coherent agents in the system using a direct means such as transaction type or attribute signaling to indicate that a transaction is coherent. In some aspects and embodiments, one or more agent interface units communicate with non-coherent agents, which themselves have no coherent caches, but require the ability to read and update memory that is coherent with respect to other coherent agents in the system using an indirect means such as address aliasing to indicate that a transaction is coherent.

For both IO-coherent and non-coherent agents, the coupled agent interface units provide the ability for those agents to read and update memory in a manner that is coherent with respect to coherent agents in the system. By doing so, the agent interface units act as a bridge between non-coherent and coherent views of memory. Some IO-coherent and non-coherent agent interface units may include coherent caches on behalf of their agents. In some embodiments, a plurality of agents communicate with an agent interface unit by aggregating their traffic via a multiplexer, transport network or other means. In doing so, the agent interface unit provides the ability for the plurality of agents to read and update memory in a manner that is coherent with respect to coherent agents in the system. In some aspects and embodiments, different agent interface units communicate with their agents using different transaction protocols and adapt the different transaction protocols to a common transport protocol in order to carry all necessary semantics for all agents without exposing the particulars of each agent's interface protocol to other units within the system. Furthermore, in accordance with some aspects as captured in some embodiments, different agent interface units interact with their agents according to different cache coherence models, while adapting to a common model within the coherence system. By so doing, the agent interface unit is a translator that enables a system of heterogeneous caching agents to interact coherently.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention, therefore, is not intended to be limited to the various aspects and embodiments discussed and described herein. Rather, the scope and spirit of invention is embodied by the appended claims.

What is claimed is:

1. A method for recovering from an uncorrectable error at a directory entry in a directory of a system, the method comprising:
   detecting, at a fault detection unit, the uncorrectable error at the directory entry;
   generating, at the fault detection unit, an output that indicates the uncorrectable error has occurred;
   triggering a logic unit that performs fault correction;
   stalling, using the fault detection unit, traffic to the directory of the system to allow temporary halting of traffic flow to the directory;
   generating, at the directory, an address list that includes a plurality of possible bad addresses based on the detection of the uncorrectable error at the directory entry, wherein the plurality of possible bad addresses is a sub-set of directory address entries in the directory and includes the uncorrectable error at the directory entry;
   sending an invalidation command to each of the plurality of possible bad addresses in the address list;
   invalidating the plurality of possible bad addresses in the address list; and
   resuming traffic to the directory thereby resuming operation of the system upon handling of the uncorrectable error to allow operation of the system with the traffic flow to the directory enabled and the directory accessible by the system's agents.

2. A cache coherent system comprising:
   a plurality of cache coherent agents, each capable of generating requests;
   memory in communication with the plurality of cache coherent agents;
   a fault detection unit in communication with the memory, the fault detection unit determines if an uncorrectable error has occurred; and
   a directory in communication with the memory,
   wherein the plurality of agents communicated with the memory and the directory, the plurality of agents generate requests, the directory receives the requests and processes the requests,
   wherein the fault detection unit generates an output to indicate that the uncorrectable error is detected at a directory entry of the directory and the fault detection unit temporarily stalls traffic to the directory,
   wherein the directory generates an address list that includes a plurality of possible bad addresses, which address list is a sub-set of directory address entries in the directory and includes an address for the uncorrectable error at the directory entry, and the directory sends an invalidation command from the directory to invalidate each of the plurality of possible bad address in the address list thereby instructing the agent to invalidate any entry located at the plurality of possible bad addresses, and
   wherein traffic to the directory is resumed to allow the system continues to operate with the directory enabled and accessible by the system's plurality of cache coherent agents.

3. The system of claim 2, further comprising a plurality of agents, each in communication with the directory, wherein at least one agent of the plurality of agents generates a request that is received by the directory.

4. A system including a non-transitory computer readable medium having code that, when executed by at least one processor, would cause the system to:
   detect, at a fault detection unit, an address associated with an uncorrectable error at a directory entry;
   generate, at the fault detection unit, an output that indicates the uncorrectable error has occurred;
   stall, using the fault detection unit, traffic to the directory to allow temporary halting of traffic to the directory;
   generate, at the directory, an address list that includes a plurality of possible bad addresses based on the uncorrectable error, wherein the plurality of possible bad addresses is a sub-set of all directory addresses in the directory and includes the address associated with the uncorrectable error at the directory entry;
   send an invalidation command to each of the plurality of possible bad addresses in the address list;
   invalidate the plurality of possible bad addresses in the address list; and resuming traffic to the directory thereby allowing operation of the system with the traffic flow to the directory enabled and the uncorrectable error cleared from the system.

\* \* \* \* \*